(12) United States Patent
Tiphane

(10) Patent No.: US 7,409,701 B1
(45) Date of Patent: Aug. 5, 2008

(54) WEB CAM WITH AN INTERLUDE SWITCH

(75) Inventor: Guy Tiphane, Atherton, CA (US)

(73) Assignee: Logitech Europe S.A., Romanel-sur-Morges (CH)

( * ) Notice: Subject to any disclaimer, the term of this patent is extended or adjusted under 35 U.S.C. 154(b) by 509 days.

(21) Appl. No.: 10/066,336

(22) Filed: Jan. 30, 2002

Related U.S. Application Data

(60) Provisional application No. 60/265,762, filed on Jan. 31, 2001.

(51) Int. Cl.
H04N 7/173 (2006.01)
(52) U.S. Cl. .......................... 725/105; 348/61; 348/143
(58) Field of Classification Search ................. 725/105; 348/61, 143, 207.1, 211.3, 159; 370/261; 707/6
See application file for complete search history.

(56) References Cited

U.S. PATENT DOCUMENTS

| | | | |
|---|---|---|---|
| 6,239,833 B1 * | 5/2001 | Ozaki et al. | 348/159 |
| 6,332,139 B1 * | 12/2001 | Kaneko et al. | 707/6 |
| 6,493,324 B1 * | 12/2002 | Truetken | 370/261 |
| 6,567,122 B1 * | 5/2003 | Anderson et al. | 348/211.3 |
| 6,636,259 B1 * | 10/2003 | Anderson et al. | 348/211.3 |
| 6,803,945 B1 * | 10/2004 | Needham | 348/207.1 |

* cited by examiner

*Primary Examiner*—Allen Wong
(74) *Attorney, Agent, or Firm*—Townsend and Townsend and Crew, LLP

(57) ABSTRACT

A web cam with an interlude switch, wherein the interlude switch can be toggled between a view and an interlude mode. In its view mode, the web cam captures images of a scene for their transmittal to a web cam page hosted at a web site. With the switch in its interlude mode, the web cam system replaces the live images with interlude content which is prerecorded content which may include still and video images, slide shows, or advertisements. The prerecorded interlude content may be stored locally at the host computer, or it may be stored at and/or provided from a remote site. A user viewing a web cam page in its interlude mode, will see prerecorded interlude content as if it was provided by the digital camera. The interlude switch may be a manual or an automatic switch configured to switch between its view and interlude modes based on the occurrence of external events. The external events may include an outgoing or an incoming telephone call. Alternately, external events such as motion, light, sound levels, movement of doors and windows could be used to cause the interlude switch to toggle from the interlude to the view mode and vice versa. The interlude switch may be a tethered switch or one which is configured to wirelessly receive input and cause the web cam to switch between a view and an interlude mode.

7 Claims, 5 Drawing Sheets

WEB CAM WITH AN INTERLUDE SWITCH

CROSS-REFERENCE TO RELATED APPLICATION

This application claims the benefit of U.S. Provisional Application No. 60/265,762, filed Jan. 31, 2001, which application is incorporated herein by reference for all purposes.

BACKGROUND OF THE INVENTION

The present invention relates to digital cameras that are most typically connected to a host computer. Such cameras have been used to send images over the internet to a web page hosted at a web site for other clients to access the web site via a browser and view the images captured by the camera and displayed at the web site. Such digital cameras when connected to a web site are commonly known as web cams. More particularly, the present invention is directed towards web cams.

Surfing the web has become quite common, and most surfers can easily discover thousands of different cameras pointing to beaches, gardens, offices, parking lots, homes, pets, and other web surfers. Examples of such cameras are the QuickCam® line of cameras manufactured by Logitech, Inc. These cameras provide for the broadcasting of live video over the web, live video calls and more. FIG. 1 is a block diagram of a typical prior art web cam setup 100. As shown in this figure, a digital camera 102 is connected to a user's computer 104. The user's computer 104 is loaded with the web cam software (not shown) which is used to capture images and prepare them for incorporation in a web page. The user's computer 104 is connected via an internet connection 106 to a server computer 108. The server computer 108 hosts a web page 110, and the web page 110 has the image 112 captured by the camera 102 incorporated therein. The web cam software handles the image capturing and periodic loading of the captured images to the web page or site 110. A client 116 desiring to view the web site 110 connects through an internet connection 114 to the server 108 to view the web page 110. A common feature of all web cams is that a web cam mounted to view a user cannot be quickly aimed at other scenes when the user does not want to be seen on the web. Simply masking the web cam or aiming it to avoid the user would make unpleasant images on the web, defeating the purpose of the web cam as a mode of communication.

It is desirable to improve digital cameras used to set up web cams so that they could easily switch from their normal "view" mode to another non-displaying mode, while not turning them off, or physically blocking their lenses.

BRIEF SUMMARY OF THE INVENTION

The present invention provides a web cam with an interlude switch. The interlude switch can be toggled between a view and an interlude mode. The web cam is a digital camera configured to be connected to a host computer, which in conjunction with a web cam software product is able to capture images of a scene and forward those images for their incorporation into a web page which may be hosted at a web site by a server. In its view mode, the web cam captures images of a scene for their transmittal to a web cam page hosted at a web site. With the switch in its interlude mode, the web cam system replaces the live images with interlude content which is prerecorded content which may include still and video images, slide shows, or advertisements. The prerecorded interlude content may be stored locally at the host computer, or it may be stored at and/or provided from a remote site. A user viewing a web cam page in its interlude mode, will see prerecorded interlude content as if it was provided by the digital camera. The interlude switch may be a manual or an automatic switch configured to switch between its view and interlude modes based on the occurrence of external events. The external events may include the initiation of an outgoing call on a telephone or the response to an incoming telephone call. Alternately, external events such as motion, sound levels, light, movement of doors and windows could be used to cause the interlude switch to toggle from the interlude mode to the view mode and vice versa. The interlude switch may be a tethered switch or one which is configured to wirelessly receive input and cause the web cam to switch between a view mode and an interlude mode.

Certain embodiments of the interlude-switch-enabled web cam work in conjunction with a voice communication system to provide for low cost video conferencing capabilities. In this embodiment, the initiation of an outgoing call triggers the web cam to its view mode. The incoming call's ID is recognized by the receiver of the a call, and the caller's ID is matched to a unique URL by referring to a either a local or a master address book, such that when the recipient of the call answers the call, the recipient's web browser will automatically go the matched URL and display the web page provided by the caller. This web page may either be a web cam page providing live images of the caller, or alternately it may be the caller's personal or business home page.

These and other embodiments of the present invention, as well as its advantages and features, are described in more detail in conjunction with the description below and attached figures.

DETAILED DESCRIPTION OF THE INVENTION

Figure 1:
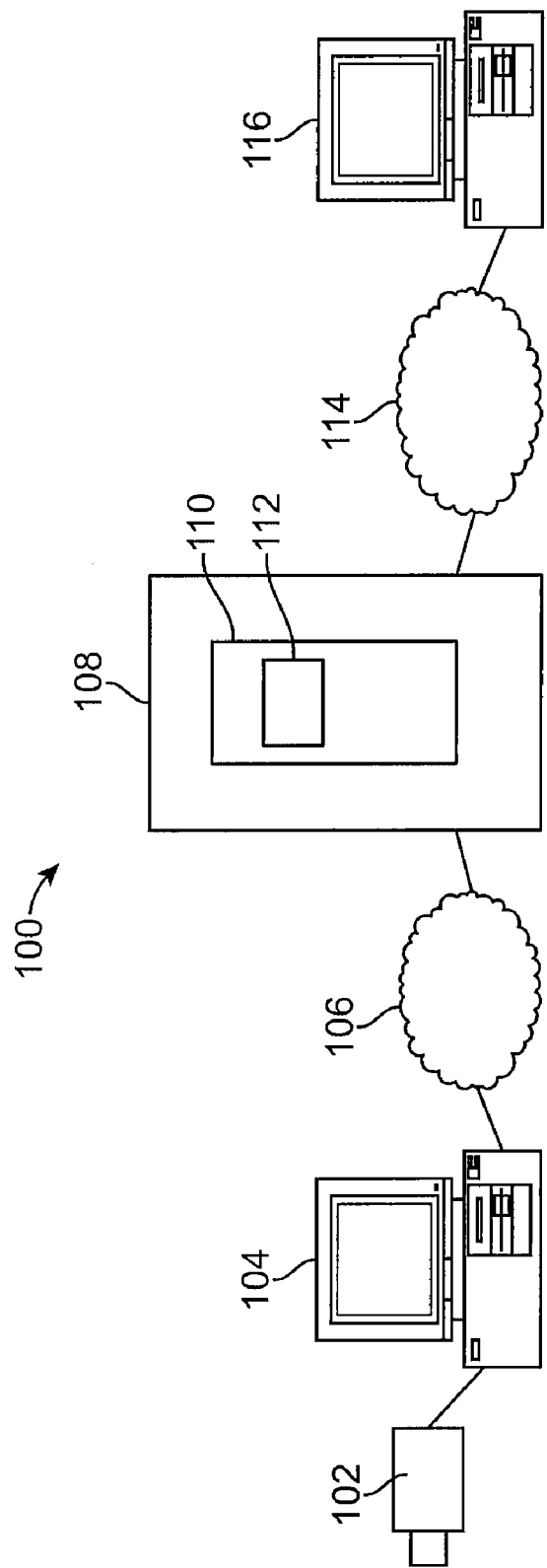
FIG. 1 is a block diagram of a prior art web cam system.
Figure 2A:
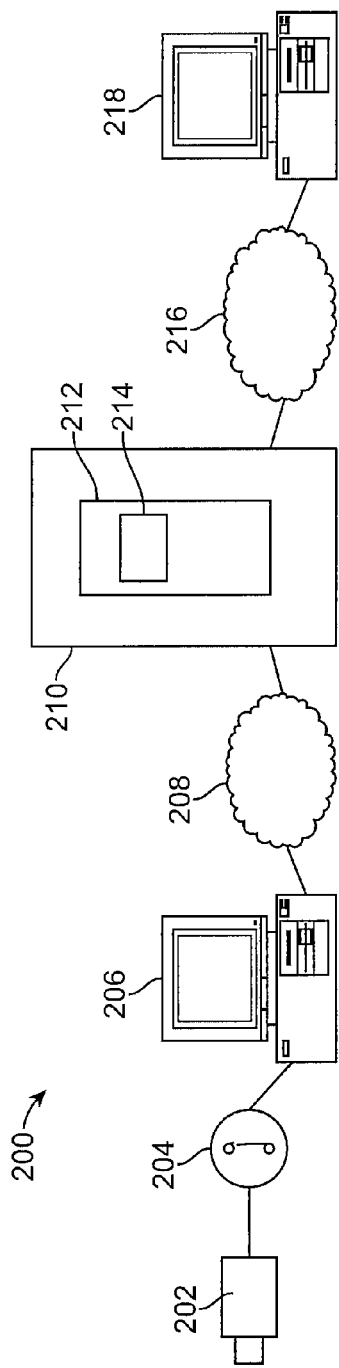
FIG. 2A is a block diagram of the view mode of a web cam system according to an embodiment of the present invention.
Figure 2B:
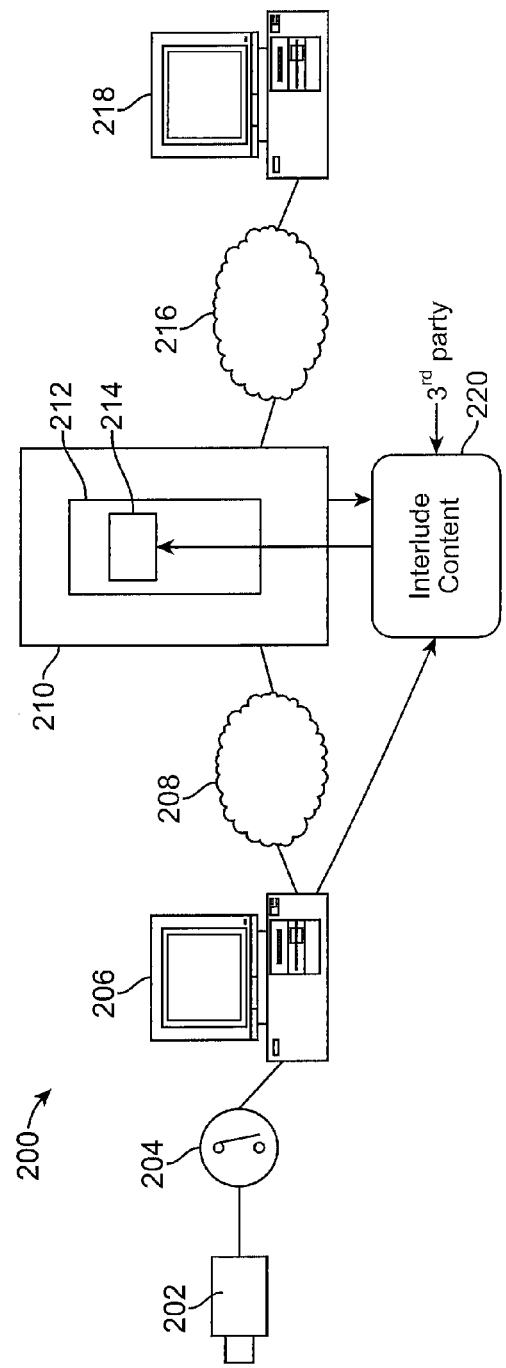
FIG. 2B is a block diagram of the interlude mode of a web cam system according to an embodiment of the present invention.

FIGS. 2A and 2B show a web cam setup configured to work in conjunction with an interlude switch. FIG. 2A shows a web cam system with the interlude switch toggled to the "view" position. The web cam system 200 functions in a manner similar to the prior art system 100 described above. As shown in FIG. 2A when the interlude switch 204 is in the view model, the system functions very similarly to the prior art system. When the switch 204 is in the view mode, camera 202 captures an image of a scene such as the user. The web cam software (not shown) loaded onto the host computer 206 is configured to capture the image of a scene, process and prepare it for transmission from the host 206 via an internet connection 208 for incorporation into a web page 212 hosted at a server 210. The captured image 214 is incorporated into the web page 212 by the web cam software loaded on the host computer 206. The web cam software may also include or may interface with necessary communication software to allow for the correct communication between the camera 202 and the web page 212. The web cam software also periodically updates the web page as is known to those skilled in the art of web cam communication. So, when the interlude switch is in its view mode, the digital camera, and web cam setup functions in a nearly identical manner to existing prior art web cam systems.

FIG. 2B shows a block diagram for the operation of the web cam when its interlude switch is in the interlude mode. In this "interlude" mode, the camera 202 stops capturing the image of the scene which it is seeing. The camera 202 and/or web cam software loaded on the host computer 206 stops sending the images, and the web cam software and or the web site 210 replaces the images by preselected images sent to the web site as if the images are originating from a web cam 202. The replacement images are referred to herein as interlude content 220 and may include still images, slide shows, movies, or commercials. The interlude content 220 can be prerecorded content stored on the host computer 206, prerecorded content stored on the server 210, or content provided by independent third parties who in turn provide it to the web server 210. Prerecorded interlude content stored locally on the host computer 206 is transferred to the server 210 via an internet connection 208. When a client 218 connects via an internet connection 216 to the sever 210 to view the web page 212, the client will see interlude content 220 in place of the image 214 displayed as if it came from the camera 202.

The interlude switch 204 may be a manual switch operable by the user. Alternately the interlude switch may be an automatic switch configured to toggle between the "view" and "interlude" modes based on the occurrence of external events. The external events may include the initiation of an outgoing call on a telephone or the response to an incoming telephone call. Alternately, external events such as motion, light, sound levels, movement of doors and windows could be used to cause the interlude switch to toggle from the interlude mode to the view mode and vice versa.

Figure 3:
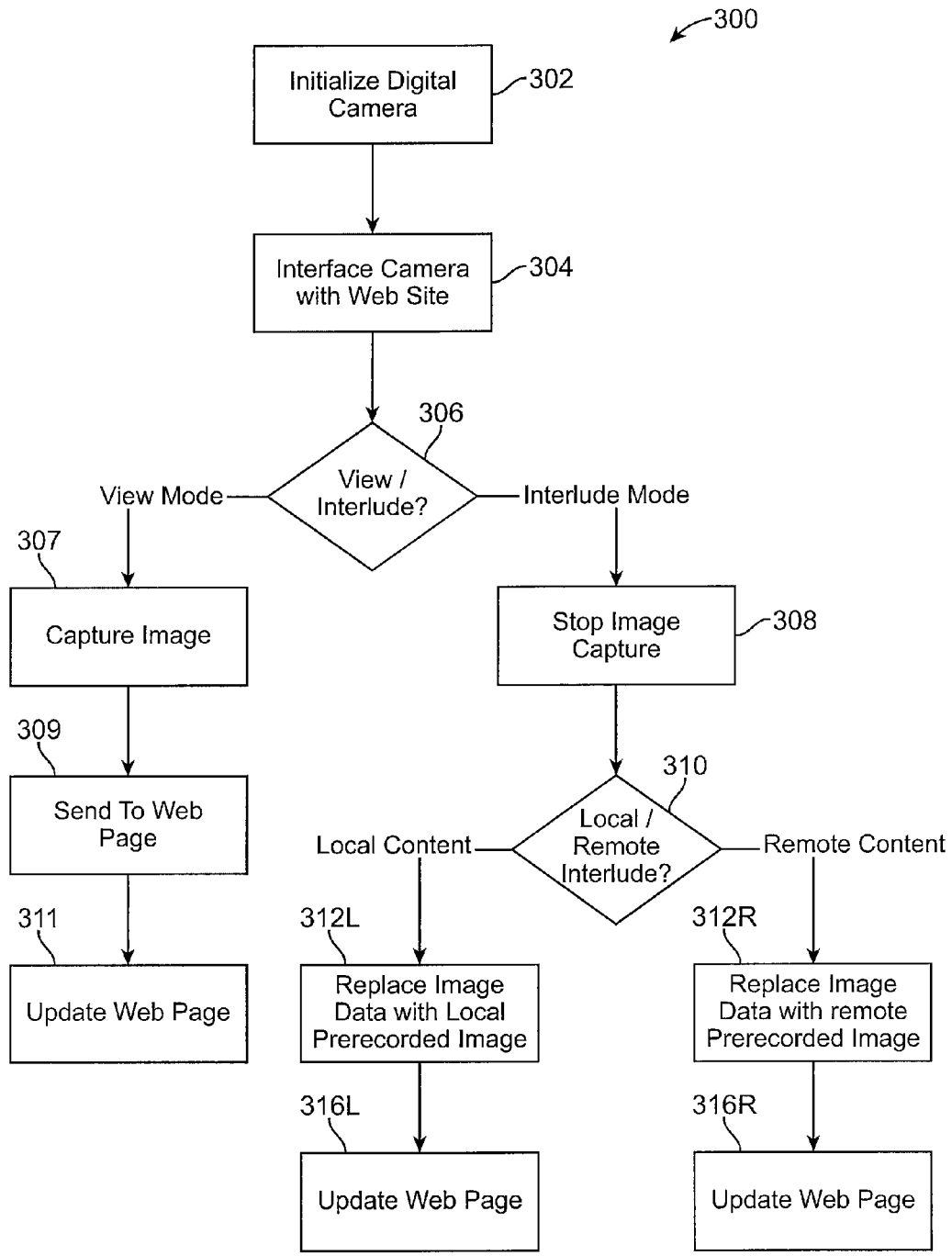
FIG. 3 is a flow chart of a method of operating a web cam configured to operate with an interlude switch.

FIG. 3 shows a flow chart 300 of a method of operation of a web cam with an interlude switch according to an embodiment of the present invention. First the digital camera is connected to the host computer and initialized in step 302. The initialization includes interfacing the digital camera with the host computer using the web cam software which has been loaded on the host computer. Besides handling the basic interfacing of the digital camera to the host computer, the web cam software may also provide various other software products such as video email software, web page builder software, video calling software, motion detection software, access to personal broadcasting web sites, multi-media play back software, video greeting card software, still and video image editing software, camera game software, and updating utilities for all these software products. These various software products may either be proprietary products developed by the assignee herein or other commercial products licensed to the assignee herein. As used herein, web cam software can include all these software products. One purpose for these software products is to enhance the usability of the digital camera as a communication tool.

In order for the camera and the web cam software to function as a web cam, the web cam software next interfaces the camera with a web site which hosts a web page which is configured to display the images captured by the digital camera (step 304). At this stage the camera is on, and is ready to transmit its image data to a web site. Next, a decision is made regarding the operational mode of the web cam. This decision concerns the choice of operating the web cam in its normal view mode, or alternately its interlude mode (step 306). The decision to operate the camera in its interlude or view mode is made by toggling the interlude switch described above between its interlude or view settings. The switch may be operated manually or it may be operated automatically in response to an external event as described above.

If it is decided to operate the camera in its view mode, the camera will capture an image of a scene (step 307). The web cam software will then transmit the captured image to a web page (step 309) and periodically update the web page (step 311) such that a client accessing the web page will see the images captured by the camera.

On the other hand, if a decision is made to operate the camera in its interlude mode, the camera and web cam software will stop capturing live images (step 308). The live camera image is then replaced by prerecorded images. The prerecorded interlude content may be supplied from a local source such as content stored on the host computer to which the camera is attached. If a decision is made (step 310) to replace the live camera image with local interlude content, the image data is replaced with local prerecorded image (step 312L) and the web cam software updates the web page (316L), such that a client accessing the web page will see prerecorded image displayed in lieu of image data from the camera as if the prerecorded images were coming from the camera. On the other hand, if a decision is made to replace the live camera image with remote interlude content, the image data is replaced with remote interlude content (step 312R) and the web cam software updates the web page (316R), such that a client accessing the web page will see prerecorded image displayed in lieu of image data from the camera as if the prerecorded images were coming from the camera. The remote interlude content, can be stored on the same server hosting the web cam page, or alternately it can be provided by third party interlude content providers. The interlude content, whether local or remote, may include still images, slide shows, movies, or commercials as described above. The advantages of improving a web cam system by providing an interlude switch are numerous. For example, when a web broadcaster does not wish to continue to transmit live images, he or she can simply switch to the interlude mode, and transmit other pleasing prerecorded images, without having to disconnect the web cam or shut down the web cam system. Alternately, commercial opportunities may be explored when web broadcasters decide to replace their live images with paid commercial content. In a sense every web cam page may be converted to an inexpensive personal commercial broadcast system.

Another advantage of the interlude switch is best articulated when the web cam and its associated interlude switch work in conjunction with a voice communication system (e.g. a telephone). In such a system the interlude switch may be configured to function automatically in response to the user initiating a telephone conversation. For example, the camera is switched to the interlude mode until the user initiates a phone conversation, at which time the interlude switch automatically toggles to the view mode and begins capturing images of the user and thus allowing for an inexpensive video conferencing system when the other party to the phone conversation points his or her browser to the particular web cam page. In this manner the web cam only transmits live images when the user is having a conference call, and once the conversation has ended the camera is switched back to its interlude mode. An alternate embodiment linking the web cam with an interlude switch to a phone system is described in FIG. 4 in conjunction with the description provided below.

Figure 4:
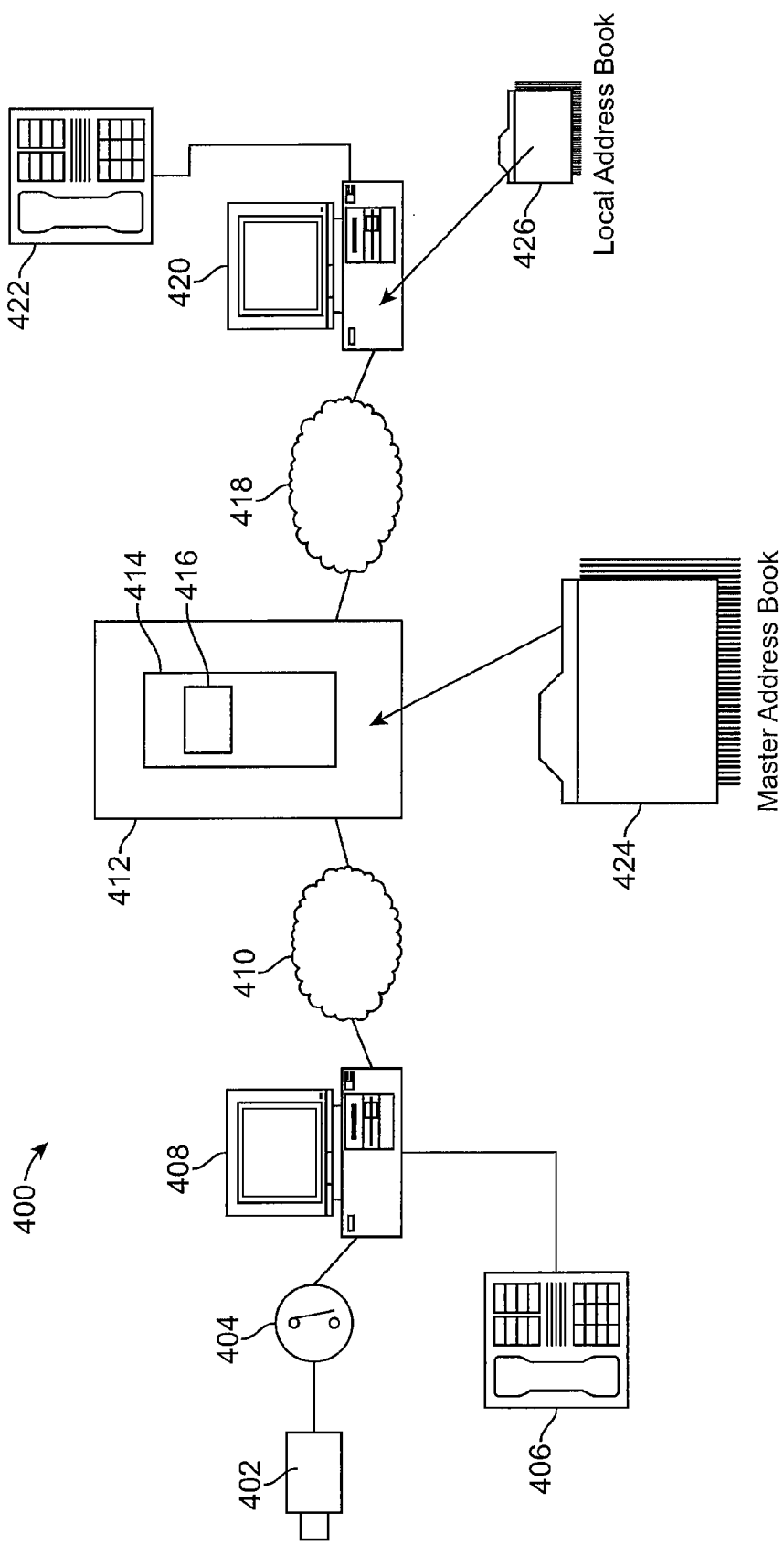
FIG. 4 is a block diagram of a communication system using a web cam with an interlude switch according to an embodiment of the present invention.

FIG. 4 shows a block diagram of a linked system 400 linking a web cam system to a voice communication system. FIG. 4 shows a digital camera 402 connected through an interlude switch 404 to a host computer 408. Additionally a voice communications system 406 is also interfaced to the host computer 408. Web cam software (not shown) loaded on the host computer 408 facilitates the interfacing of the camera 402 to the host computer 408. Additional software loaded on the host computer facilitates the interfacing of the voice communications system with the host computer 408. The host computer 408 is connected to server 412 via an internet connection 410. The server 412 is configured to host a web page 414, and the web page 414 can be configured to display images 416 transmitted by the camera 402 as in a typical web cam page. The server 412 also stores a master address book file 424, which stores a listing of matched caller ID's and web site URL's. On the receiving end, a client computer 420 is also configured to be connected to a server 412 via an internet connection 418. The client computer 420 is also configured to be interfaced with a voice communications system 422. Additionally, the client computer 420 stores a local address book file 426, which holds a local listing of matched caller ID's and web site URL's. The system shown in FIG. 4 allows for the operation of low cost video conferencing system, which is described below in conjunction with FIG. 5.

Figure 5:
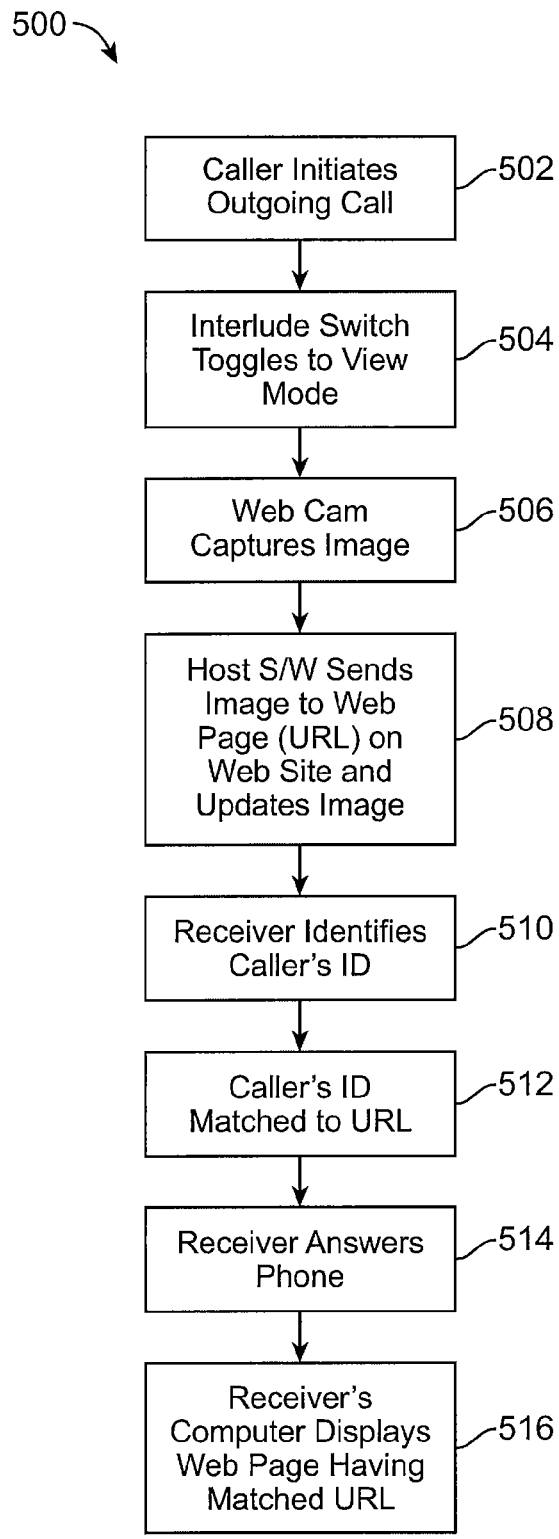
FIG. 5 is a flow chart of a method of operating a communication system using a web cam with an interlude switch according to an embodiment of the present invention.

FIG. 5 shows a flow charts 500 of a mode of operation of the system described above and shown in FIG. 4. First a caller initiates an outgoing call (step 502) using the voice communications system 406. The initiation of the outgoing call causes the interlude switch 404 to toggle to the view mode (step 504). Once the interlude switch is set to the view mode, the camera 402 in conjunction with the web cam software captures images of the caller (step 506). Next, the web cam software sends the captured images via an internet connection 410 to the web page 414 hosted on the server 412. The web cam software, in addition to sending images to the web site, also periodically updates the images (step 508). Once the outgoing voice communication call is detected by the receiving voice communication system 422, the client computer 420 detects the incoming call's caller ID (step 510). Next, the caller's ID is matched to a unique URL (step 512). The appropriate software loaded in the client computer 420 will match the caller's ID to a URL by looking up the matching URL in either the local address book 426 or the master address book 424. Once the receiver answers the incoming call (step 514) the receiver's computer will display the web page having the matched URL by connecting to the server 412 via an internet connection 418. The web page with the matched URL can be the web page hosting the web cam, thus allowing a very easily configurable teleconferencing system. Since the caller's camera can be automatically switched when the outgoing call is placed, the receiving party is thus able to see the images sent by the camera automatically and without further intervention. Alternately, the matched URL could be any web site's URL, and not necessarily a web cam page, e.g. the caller's personal or business home page.

The voice communications system may be an ordinary analog or digital phone system. Alternately, the phone system may be a combined computer and internet system, wherein the computer has additional hardware such as a microphone, speakers and sound cards for voice communication. The so-called telephone calls are made by one computer calling to the IP address of another computer using special software on both the outgoing and receiving ends to send digitized voice across the internet from the outgoing computer to the receiving computer. Communications software installed on both the outgoing and receiving computers facilitate the voice comminations. Yet another alternate embodiment to the voice communication system is the internet telephony system, where a normal phone makes normal calls to another phone and the calls are routed over the internet rather than through normal phone devices. Depending on the choice of the voice communications system, the caller ID can be either the ordinary caller ID, or it can be the IP address of the outgoing call.

This voice and video communications system is practically free because its users do not have to subscribe to any service other than their usual subscriptions for voice communication and internet access. The system can also be beneficial to telemarketers. Telemarketers could cause the receiver's browser to point to a web site offer when they call the receiver. Users of the system would be very satisfied by such a system where telemarketers would volunteer their caller ID information and give control to the user IQ while still delivering their message.

Numerous other embodiments can be envisaged, in addition to the integration of the web cam with an interlude switch for use as a video conferencing tool. For example, an alternate embodiment could be used in a home-based system. In such a home-based system, the user could be resting at home and watching TV waiting for the arrival of his or her spouse. When the garage door opens, the TV view is switched to the web cam in the garage to show the arriving spouse. Another home-based embodiment, would switch the TV view to the child's room based on a sound level signal or motion detected by the web cam in the child's room. The same arrangement could be used in a security system, where motion or sound could trigger web cams to switch to the view mode and thus transmit appropriate images from certain locations under surveillance. In all the embodiments described thus far, the computer could be interchanged with an intelligence host device coupled to a TV. Once the triggering event was cleared, the interlude switch could be manually reset back to TV viewing. The interlude switch could be configured to interface with the home network either through a tethered or a wireless connection. Another embodiment of a system using a web cam with an interlude switch is useable in a hospital or health care facility, where a patient's call to the health care provider, would cause the web cam in the patient room to switch to the view mode, thus allowing the health care provider to see the patient. Yet another embodiment could be used by stores, where the TV program being viewed by a store clerk could switch to a web cam image upon the occurrence of an external event such a car entering a parking lot, or any other external event.

As will be understood by those of skill in the art, the present invention may be embodied in other specific forms without departing from the essential characteristics thereof. For example, the interlude switch could be a manual or an automatic switch triggerable by external events, or that the computer or server could be any series of devices commonly referred to as intelligent hosts, which are capable of data storage and interfacing with typical peripheral devices. Accordingly, the foregoing disclosure is intended to be illustrative, but not limiting, of the scope of the invention which is set forth in the following claims.

What is claimed is:

1. A web cam system, comprising:
   a digital camera for capturing an image of a user,
   wherein said digital camera is configured to generate image data,
   wherein said digital camera is configured to be connected with a computer, and
   wherein said digital camera is configured to provide said image data to said computer;

a computer readable medium encoded with computer executable instructions embodied therein for causing the interfacing of said digital camera with said computer, said computer executable instructions comprising:

an image capturing computer readable program code portion configured to cause said computer to effect the capturing of said image, wherein said image comprises still or video images;

an internet interfacing computer readable program code portion configured to cause said computer to effect the transmittal of said image data, for incorporation of said image data into a web cam page, to a web site hosting said web cam page; and an interlude switch, wherein said interlude switch is configured to be toggled between a view mode and an interlude mode;

wherein said view mode provides live images from said digital camera; and wherein said interlude mode provides at least one alternate image from a source other than a live image captured by said digital camera;

wherein said interlude mode is active in the absence of a phone call by a user;

wherein, upon detecting the initiation of a phone call by a user, said interlude switch switches to said view mode to provide said live image;

wherein said interlude switch when toggled to said interlude mode:

causes said image capturing computer readable program code portion to stop said digital camera from capturing images of a scene;

causes said internet interfacing computer readable program code portion to effect the replacement of said image data with preselected images; and causes said internet interfacing computer readable program code portion to effect the transmittal of said preselected images, for incorporation of said preselected images into said web cam page, to a web site hosting said web cam page, as if said preselected images were captured by said digital camera.

2. The web cam system of claim 1 wherein said interlude switch when toggled to said view mode:

causes said image capturing computer readable program code portion to drive said digital camera to capture images of a scene; and causes said internet interfacing computer readable program code portion to effect the transmittal of said image data, for incorporation of said image data into said web cam page, to a web site hosting said web cam page.

3. The web cam system of claim 1 wherein said alternate image is one of: still images, slide shows, video images, commercials, or images captured by another web cam system.

4. The web cam system of claim 3 wherein said preselected images are stored on said computer.

5. The web cam system of claim 3 wherein said preselected images are stored at a remote site.

6. The web cam system of claim 1 wherein said interlude switch is computer code configured to cause a change in the source of images.

7. The web cam system of claim 1 wherein said source other than a live image captured by said digital camera is a second digital camera.

* * * * *